United States Patent

[11] 3,573,609

| | | |
|---|---|---|
| [72] | Inventor | John L. Vaher<br>Chicago, Ill. |
| [21] | Appl. No. | 802,815 |
| [22] | Filed | Feb. 27, 1969 |
| [45] | Patented | Apr. 6, 1971 |
| [73] | Assignee | American Gage & Machine Company<br>Chicago, Ill. |

[54] DISTRIBUTOR ADVANCE TESTER WITH TACHOMETER
4 Claims, 7 Drawing Figs.

[52] U.S. Cl. .................................................. 324/17, 324/170
[51] Int. Cl. ....................................................... F02p 17/00
[50] Field of Search........................................... 324/15-—18, 70; 73/116; 340/268

[56] References Cited
UNITED STATES PATENTS
2,715,711  8/1955  Wells............................  324/16
3,368,143  2/1968  Roberts........................  324/16

FOREIGN PATENTS
1,487,232  6/1967  France..........................  324/16

*Primary Examiner*—Michael J. Lynch
*Attorney*—McDougall, Hersh, Scott and Ladd

ABSTRACT: A hand held timing advance tester and tachometer construction for internal combustion engines which includes a source of stroboscopic light and an instrument displaying a first scale for measuring engine speed and a second scale for measuring engine advance. Each time the selected cylinder fires, a flash tube is energized. A time delay circuit will either trigger the flash tube energizing circuit immediately in response to each high voltage pulse applied at the input or will trigger it after a time delay, which is continuously and selectively variable by means of a manual control. The time delay circuit also applies a signal to the indicator, which provides a visual indication of the amount of delay provided by the time delay circuit.

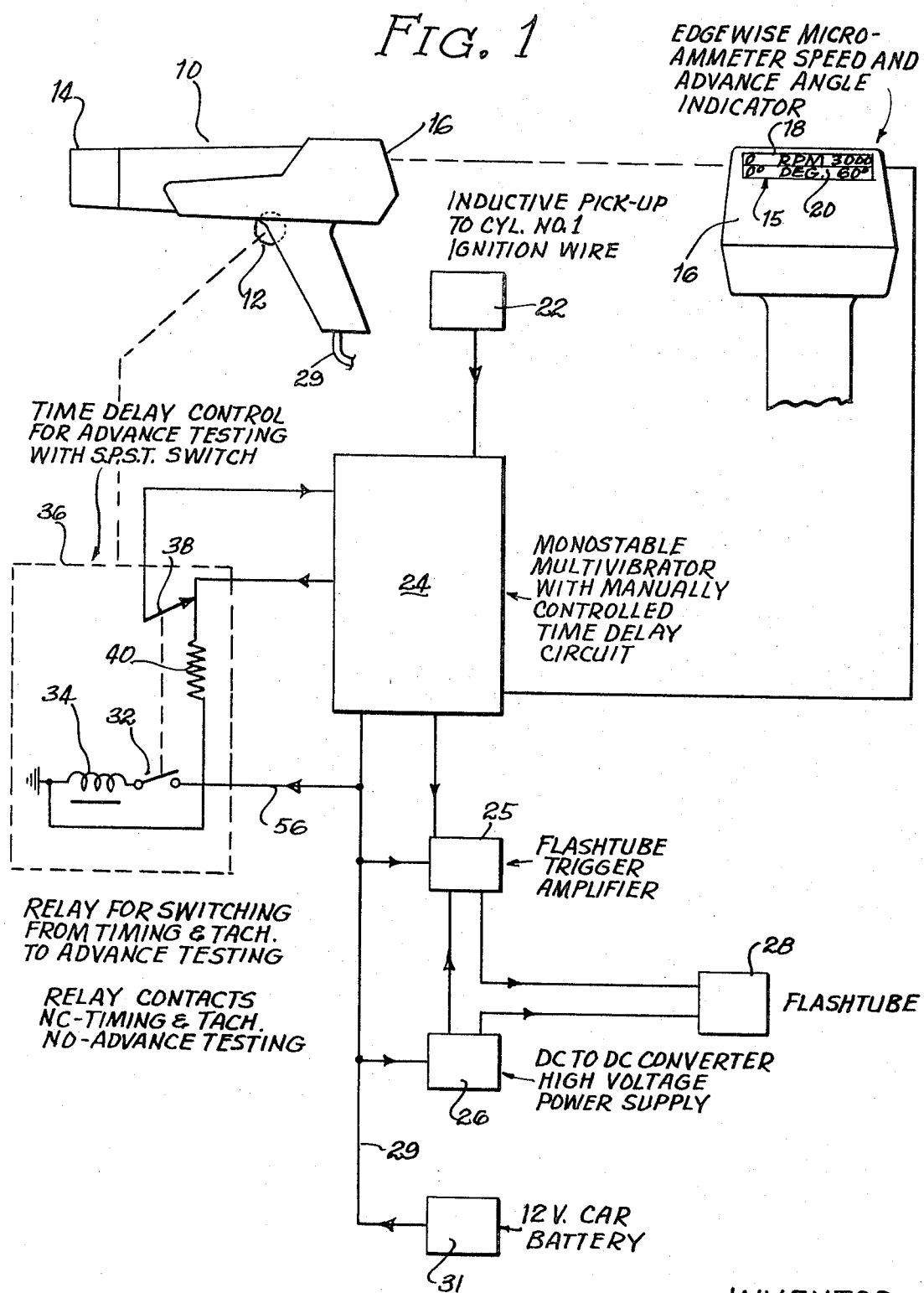

Patented April 6, 1971 3,573,609
3 Sheets-Sheet 2
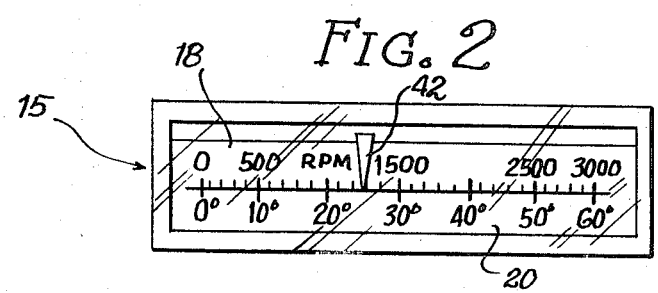
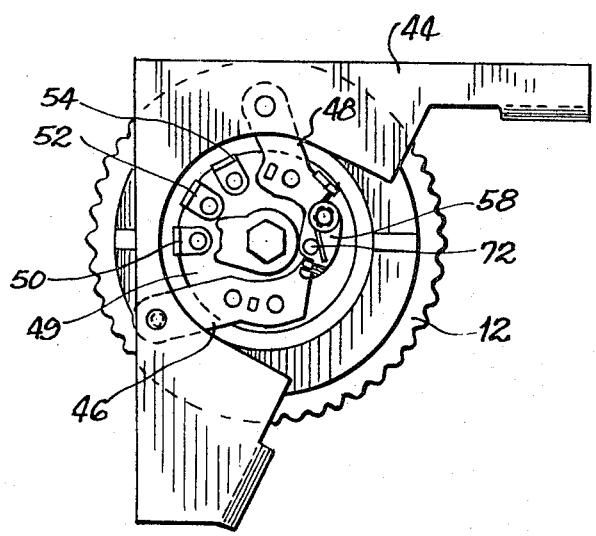
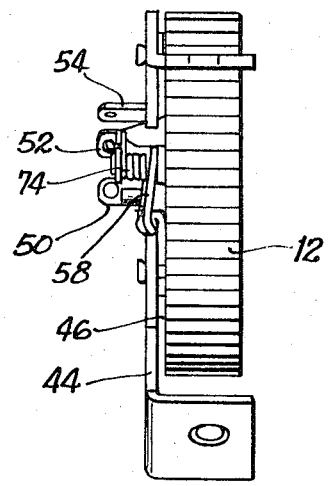
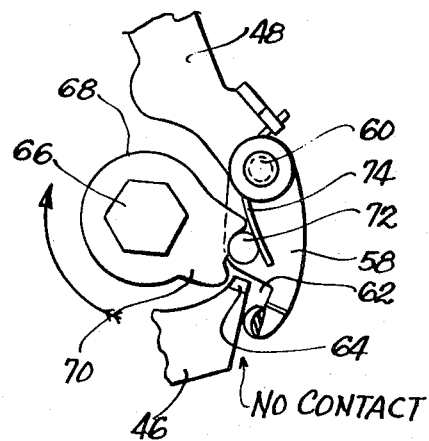

DISTRIBUTOR ADVANCE TESTER WITH TACHOMETER

This invention relates primarily to a construction comprising a timing advance tester. The construction is a manually held device which preferably includes a tachometer directly associated therewith so that engine speed readings can be secured in a highly convenient fashion when advance measurements are being made.

In internal combustion engines, it is important to provide reliable means for testing the ignition system. In particular, the firing of spark plugs in the combustion chambers is a critical factor in engine operation, and mechanisms for determining the instant of firing are widely used. These mechanisms are generally referred to as devices for determining engine timing, and they usually involve the use of stroboscopic lights.

In such mechanisms, a control knob in a first position places the instrument in a circuit with an engine ignition wire whereby signals transmitted upon firing of the number one plug will provide a tachometer reading and the stroboscopic light will illuminate the timing marks on the engine of the vehicle thereby providing a means for determining the basic timing of the engine.

The control knob in a second position places the instrument and the stroboscopic light in a circuit with a variable time delay arrangement. The time delay is controlled by the knob in this position, and the indicator degree reading on the second scale will give the degrees of advance of the firing of the cylinder number one plug. The advance is read on the indicator after the timing mark is brought (by setting the proper delay with the control knob) to a position opposite the "top dead center" on the vehicle timing scale.

The measurements referred to depend to a large degree on engine speed. Thus, the operator must know the engine speed in order to determine the significance of the engine advance readings. In the usual situation, a tachometer is employed in conjunction with advance testing construction so that the angle of advance can be related to the engine speed.

It is a general object of this invention to provide an improved construction for advance testing in internal combustion engines.

It is a more particular object of this invention to provide an advance testing construction which is manually held, which includes circuit elements providing simplified means for making advance measurements, which accomplishes this without breaking car ignition wiring, which also provides means to prevent noise signals caused by ignition spark from interfering with measurements, and which includes a tachometer in direct association with the manually held instrument to greatly simplify overall testing operations.

These and other objects of this invention will appear hereinafter and for purposes of illustration, but not of limitation, specific embodiments of the invention are shown in the accompanying drawings in which:

FIG. 1 is a schematic illustration of the instrument of the invention;

FIG. 2 is an end view of an instrument employed in the hand-held construction for reading engine speed and advance;

FIG. 3 is a plan view of a control knob employed in the construction;

FIG. 4 is an end elevation of the control knob;

FIG. 5 is a fragmentary detail view illustrating the switching means in the control knob;

Figures 6, 7:
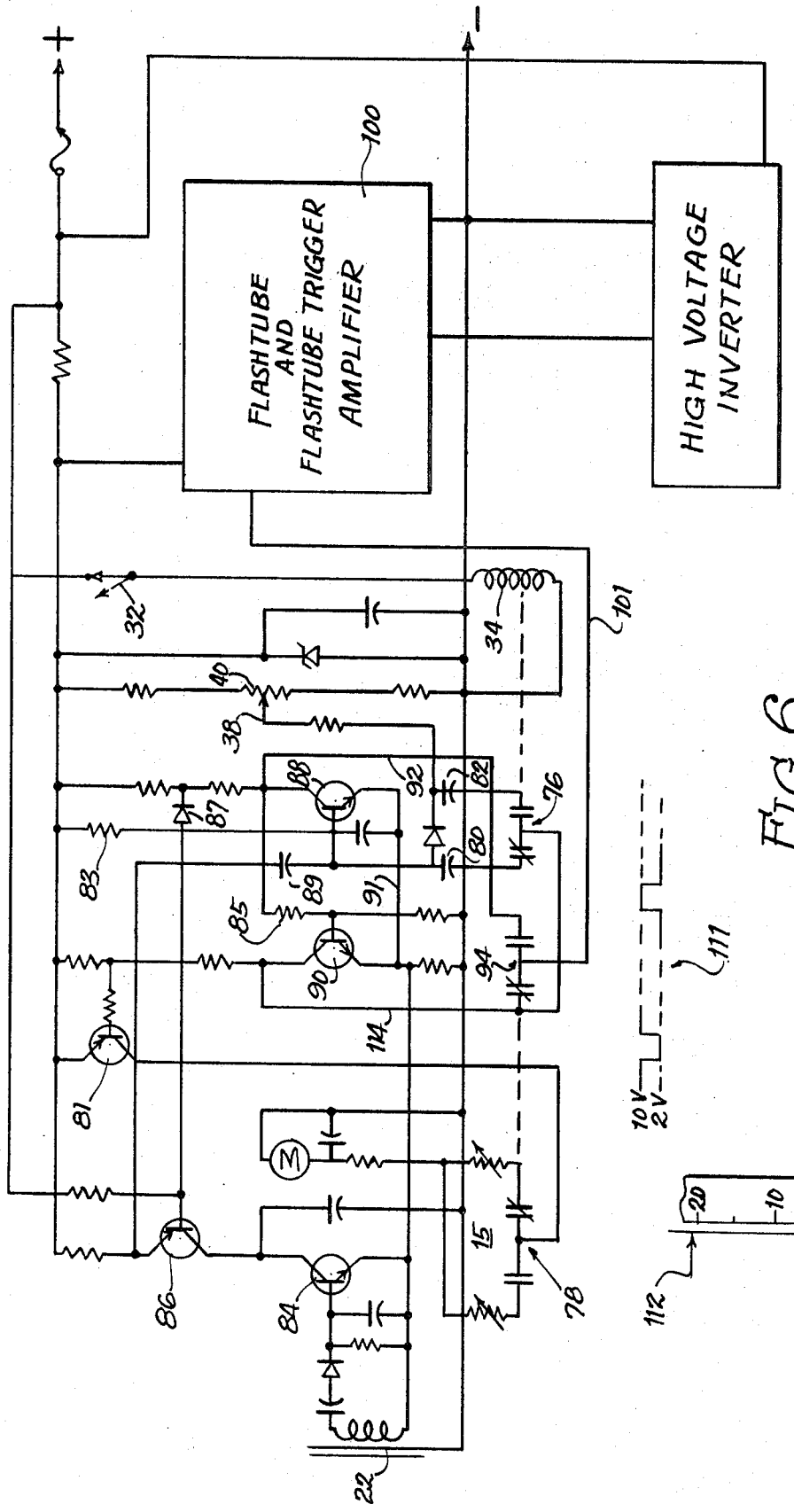
FIG. 6 is a circuit diagram employed in the construction.
FIG. 7 is a schematic illustration of scale means employed in an engine construction.

The construction of this invention generally comprises a hand-held housing in the form of a gun. A stroboscopic light is positioned at one end of the housing so that flashes of light can be directed onto the scale means provided in the engine construction being tested. An edgewise instrument is located at the opposite end of the gun, and this instrument is provided with first and second scales for measuring engine speed and engine advance.

The gun also includes a control knob which operates a switch which places an engine ignition signal in a circuit with the instrument whereby the gun can be employed for testing engine speed. When the knob is moved from this position, a separate circuit is introduced for advance testing. This circuit is manually variable by means of the control knob, and operation of the circuit will provide a direct reading of the engine advance on the instrument.

The arrangement schematically shown in FIG. 1 comprises the hand-held construction 10 which includes a control knob 12, and a stroboscopic light located at the end 14 of the construction. The opposite end 16 of the construction has an instrument 15 mounted therein, this instrument displaying a first scale 18 for measuring engine speed and a second scale 20 for measuring the degree of engine advance.

The system includes various electrical components including an inductive or magnetic pickup attachment 22 whereby the instrument can be connected to the ignition wire of the number one cylinder. With this arrangement, the signals generated by the firing of the spark plug for this cylinder can be fed to the control circuit 24. A flash tube trigger amplifier 25 and converter 26 are included between the circuit 24 and flash tube 28, the latter being employed as a high voltage power supply for the flash tube. A lead 29 is provided for attachment to the car battery 31 to provide a source of power.

The control knob 12 operates a switch 32 and relay 34 as shown schematically within the block 36. The control knob includes a wiper arm 38 which traverse resistor 40 as the control knob rotates. When the knob is turned to an end position, the switch 32 is closed to operate the relay 34. As will be explained, the construction serves as a tachometer when the switch 32 is open and as a means for measuring engine advance when the switch is closed.

FIGS. 2 through 5 illustrate certain components of the construction in greater detail. The instrument 15 preferably comprises an edgewise instrument such as shown in FIG. 2 with frequency meter means for moving the indicator needle 42 over the scales 18 and 20. This type of instrument is particularly suited for a construction of the type contemplated since the indicator 42 is very easy to read irrespective of the scale being considered. The use of an edgewise instrument is also particularly desirable since its compact structure can be easily accommodated in a structure designed as illustrated in FIG. 1.

The control knob 12 and associated elements are shown in detail in FIGS. 3, 4 and 5. This construction includes a supporting bracket 44 having contact arms 46 and 48 connected thereto. If the bracket 44 is formed of a conductive material, then an insulating washer or the like must be inserted between the arms and the bracket.

The arms 46 and 48 and terminals 50, 52 and 54 are mounted on an insulating base 49. The construction is included in the operating circuit by securing the lead wire for relay 34 to the arm 46. The lead wire 56 shown in FIG. 1 is connected to the arm 48, and the structure comprising the switch 32 extends between the arms 46 and 48. This structure consists of a swinging arm 58 pivotally connected at 60 to the arm 48 and including a groove 62 which engages the projection 64 formed on the arm 46 when the switch is closed.

The knob 12 defines a central opening which receives pin 66. This pin carries a camming element 68 which defines an outward extension 70 adapted to engage the post 72 carried by the switch arm 58. A spring 74 normally holds the switch arm in the closed position as shown in FIG. 3. When the knob 12 has been rotated to the position shown in FIG. 5, the extension 70 will force arm 58 outwardly, thereby opening the switch.

When the switch 32 is closed, the knob 12 is free to move and the wiper arm 38 is attached to the pin 66 whereby the arm 38 will traverse the resistor 40. The arm 38 and resistor 40 are included within the insulating base 49. Terminals 50 and 54 are connected to the ends of the resistor, and terminal 52 is connected to the wiper arm.

In the circuit diagram of FIG. 6, the switch 32 is shown in the closed position whereby the relay 34 is energized. The relay 34 controls the pole switches 76, 78 and 94. The switch 78 is associated with the instrument 15 while the switch 76 is associated with capacitors 80 and 82. The switch 94 is associated with the stroboscopic circuit 100 which includes the flash tube.

In the operation of the circuit, the magnetic pickup 22 delivers a positive-going pulse from cylinder No. 1 spark plug wire to the base of transistor 84. Transistor 84 passes this now in phase reversed pulse through normally conducting transistor 86 to the base of conducting transistor 88 of the monostable multivibrator consisting of transistors 88 and 90. This negative-going pulse is passed through capacitor 89 to the base of transistor 88 to back bias it; the turning off of transistor 88 will pass a positive-going pulse from the collector through resistor 85 to the base of off transistor 90 of the monostable multivibrator which will now turn on. At the same time, the positive-going pulse from the collector of transistor 88 passes through diode 87 to turn off transistor 86 and prevents engine noise and spurious signals from disturbing the operation of the instrument during the unstable state of transistors 90 (on) and 88 (off) of the monostable multivibrator.

With the control knob in the timing (first) position conducting transistor 90 provides a discharge pass through switch 76 for capacitor 80. After the completion of discharge, the capacitor 80 starts to charge through resistor 83 and after the elapsed time equal to the time constant defined by resistor 83 and capacitor 80, the monostable multivibrator will return to its stable state (transistor 88 on—90 off) and will be ready to receive the next pulse from cylinder No. 1. The signal delivered from the collector of transistor 90 to meter 15 of the instrument will provide an r.p.m. reading on the scale 18.

Transistor 81 acts as a pulse inverter and also insulates the metering circuit from the monostable multivibrator output to the flash tube driver. This transistor inverts the negative-going pulse from the collector of transistor 90 and passes a positive-going pulse to the meter 15. The leading edge of the negative-going pulse from the collector of transistor 90 will, through line 101, actuate the flash tube circuitry, which is conventional, to provide a synchronized light source for initial timing of the engine.

With the control knob in the advance (second) position conducting transistor 90 provides a discharge path to capacitor 82. After the completion of discharge, the capacitor 82 starts to charge through the potentiometer 40 and after the elapse of time equal to the time constant defined by capacitor 82 and the location of potentiometer wiper arm 38, the monostable multivibrator will return to its stable state.

The signal delivered from the collector of transistor 90 to the meter 15 of the instrument will provide a degree reading on the scale 20. The instrument 15 actually reads the pulse width delivered by the time delay arrangement defined by capacitor 82 and potentiometer wiper arm 38. The trailing edge of the positive-going signal delivered from the collector of transistor 88 will actuate the stroboscopic light through line 101 after the time delay defined by capacitor 82 and wiper arm 38, thus providing a means for the instrument to determine the actual advance or retard time of the engine under test.

In the practical application of the timing advance mechanism, the operator will aim the construction 10 at the engine fly wheel or other marked rotating element to freeze the position of the scale 110 and stationary mark 112. (FIG. 7). If the stationary mark 112 is out of alignment with the zero or "top dead center" position on the scale, then the operator will move the control knob until the flashes of light are in phase with the alignment of the zero position with mark 112. The indicator scale 20 will then provide a reading of the engine advance at the conditions of the test.

In order to secure an engine speed reading, the operator can turn the knob 12 to open the switch 32. This will deenergize the relay 34 whereby the switches 76, 78 and 94 will revert to the normally closed positions. In this position of the switch 94, the line 114 will normally be at line voltage. When a signal resulting from spark plug firing turns on the transistor 90, however, the voltage in the line 114 will drop whereby a negative going signal will be delivered for operation of the flash tube. The voltage in the line 114 is restored to line voltage when, at the completion of discharge of the capacitor 80, the transistor 88 turns back on.

In a typical operation, the line voltage can be regulated at about 10 volts with a voltage drop to about 2 volts occurring depending upon the conducting or nonconducting state of the transistors 88 and 90. This typical voltage variation is graphically shown at 111 in association with FIG. 6. Obviously, variations in these FIGS. are possible, particularly since the electrical components including the instrumentation employed can be selected and calibrated to accomplish the desired result.

It will be appreciated that the construction described provides certain distinct advantages from the standpoint of operating convenience. An operator can direct the flashes of light onto the rotating fly wheel or other rotating element, and read the r.p.m. in the same line of sight. In this phase of operation, the operator can also determine visually the approximate angle of advance. When the operator then moves the control knob to energize the relay 34, the phase of the flashes will change and continued movement will finally enable the operator to bring the zero position into line with the stationary mark 112. Because of the changes in the circuit brought about by movement of the control knob, the scale 20 will record the degree of advance. Obviously, the operator can make the necessary readings very quickly and with a great deal of accuracy.

The above description has made reference to determining engine advance; however, it will be appreciated that the construction will also provide a reading of engine retarding. Thus, the same operating principles are involved, and for this reason, references to "engine advance" in the description and claims are intended to include engine retard.

It will be understood that various changes and modifications may be made in the above described system which provide the characteristics of this invention without departing from the spirit thereof particularly as defined in the following claims.

I claim:

1. A hand-held timing advance tester and engine speed reading construction comprising a barrel portion and a handle portion, a stroboscopic light source attached at one end of said barrel, an electric current meter at the other end of said barrel having a face with first and second scales, one of said scales displaying degrees of engine advance, and the other scale displaying engine speed units, an inductive pickup means extending from said construction for connection with an ignition wire, manually variable control means for said construction, a monostable multivibrator circuit, means connecting said inductive pickup means to trigger said monostable multivibrator circuit to its unstable state, means connecting said monostable multivibrator circuit to actuate said stroboscopic light when said monostable multivibrator circuit returns to its stable state, means connecting said monostable multivibrator circuit to said meter to apply a substantially constant current to said meter whenever said circuit is in its unstable state, said monostable multivibrator circuit including time delay means having a variable resistor controlled by said control means to permit manual adjustment of the period of said monostable multivibrator during a measurement of the timing advance of an engine, a fixed value resistor and switch means operated by said control means to adapt said construction for measurement of the speed of an engine, said switch means being operative to connect said fixed value resistor in place of said variable resistor in said time delay means so that said monostable multivibrator circuit has a predetermined, fixed period during an engine speed measurement.

2. A construction in accordance with claim 1 including selectively operable means to permit actuation of said stroboscopic light substantially simultaneously with production of a signal by said inductive pickup means.

3. A construction in accordance with claim 1 wherein said electric current meter comprises an edgewise mounted instrument, and including a horizontally disposed rectangular opening at said other end of said barrel for viewing the scales on said instrument.

4. A construction in accordance with claim 1 wherein said control means comprises a rotatably mounted finger actuated knob located adjacent the intersection of said barrel and handle.